United States Patent [19]

Kajima et al.

[11] Patent Number: 4,653,185
[45] Date of Patent: Mar. 31, 1987

[54] APPARATUS FOR MOUNTING TENSION SPRINGS AUTOMATICALLY

[75] Inventors: Yutaka Kajima; Eiji Suzaki, both of Akishima, Japan

[73] Assignee: Tachikawa Spring Co. Ltd., Tokyo, Japan

[21] Appl. No.: 798,381

[22] Filed: Nov. 15, 1985

[51] Int. Cl.⁴ .................... B23Q 7/10; B23P 19/04
[52] U.S. Cl. ................................ 29/809; 29/225; 29/227
[58] Field of Search ............ 297/455, 456; 29/700, 29/809, 225, 226, 227, 446

[56] References Cited

U.S. PATENT DOCUMENTS

| | | | |
|---|---|---|---|
| 2,042,287 | 5/1936 | Allievi et al. | 29/227 |
| 2,811,772 | 11/1957 | Johnson | 29/227 |
| 2,958,375 | 11/1960 | Bond | 297/456 |
| 3,017,691 | 1/1962 | Austin et al. | 29/227 |
| 3,195,955 | 7/1965 | Richardson et al. | 297/456 |
| 3,859,705 | 1/1975 | Dulude et al. | 29/227 |
| 4,224,731 | 9/1980 | Lingle | 29/809 |

Primary Examiner—Howard N. Goldberg
Assistant Examiner—Steven Nichols
Attorney, Agent, or Firm—Cushman, Darby & Cushman

[57] ABSTRACT

An apparatus for automatically mounting tension springs (tension coil springs) to suspend a seat frame and a pad receiving member forming an automotive seat is disclosed which comprises a supply hopper, a transfer mechanism, a guide member, a setting device and a direction restricting member. In the apparatus, when loaded into the supply hopper, the tension springs are separated from one another and then discharged one by one therefrom to the transfer mechanism, where they are rectified in the right and left deviations thereof by the guide member before they are delivered to the setting device. Then, the tension springs are caught and lifted up by the setting device and, during this lifting operation, they are rectified in the direction thereof by the direction restricting member, so that they can be automatically mounted to the seat frame as well as to the pad receiving member.

9 Claims, 8 Drawing Figures

A          B

APPARATUS FOR MOUNTING TENSION SPRINGS AUTOMATICALLY

BACKGROUND OF THE INVENTION

1. Field of the Invention

The present invention relates to an apparatus for automatically mounting tension springs (tension coil springs) to a seat frame of a vehicle seat or the like, which tension springs are used to support a pad receiving member.

2. Description of the Prior Art

Conventionally, a seat for use in a vehicle or the like includes such a cushion structure as disclosed in Japanese Utility Model Publication No. 47-5882.

In the above-mentioned cushion structure, as shown in FIG. 8, between two side portions (1a)(1b) of a seat frame (1) located within the seat, a so-called "screen-like" pad receiving member (5), which is formed by extending a plurality of wires (3) between two side members (2a)(2b) and then inserting a separation member (4) between these wires (3), is resiliently provided via a plurality of tension springs S which are positioned at the two sides of the pad receiving member (5), so that a comfortable cushioning effect can be obtained by such resiliency.

Mounting of the above-mentioned tension springs S for the pad receiving member (5) in the seat frame (1) is performed almost by means of manual operations in the prior art. Also, in the prior art, to mount the tension springs to the seat frame, a required number of tension springs S are sequentially mounted to one side portion of the seat frame (1) from either of the forward or rearward portion thereof in such a manner that one of two hook portions symmetrically formed in the two ends of each of the tension springs S is engaged with a side member of the pad receiving element (5) and the other hook portion is inserted through a through-bore (6) formed in the side portion of the seat frame (1) as an engagement portion; and then, similarly, a required number of tension springs S are mounted to the other side portion of seat frame (1) as well.

In the above-mentioned conventional tension spring mounting operations, the mounting of the tension springs in the one side portion of the seat frame can be performed relatively easily, while the mounting operations of the tension springs in the other portion after the mounting operations in the above-mentioned one portion are very difficult to be carried out.

In other words, in a condition that the tension springs have been installed between the one side portion (1a) of the seat frame (1) and the one side member (2a) of the pad receiving element (5), when mounting the tension springs S in the other portion (1b) thereof, at first the other side member (2b) of the pad receiving means (5) is pulled toward the other side portion (1b) of the seat frame (1) against the biasing forces of the already-installed tension springs in the one side portion of the seat frame and then, while maintaining this tensioned state, the respective both-side hook portions of the tension springs S must be made correspond accurately to the through bores (6) of the seat frame (1) and the other side member (2b) of the pad receiver (5) for engagement therewith. Thus, this operation requires a great deal of labor and is not efficient.

To avoid the above-mentioned laborious manual operation, conventionally, there has been made a trial which uses a so-called "industrial robot" to perform the mounting operation of the tension springs S automatically. However, in the automatic tension springs mounting operation by the robot, there are many problems to be solved: for example, it is difficult to catch or grasp one tension spring to be mounted out of a great number of tension springs because the hook portions of the tension spring may be entangled with the hook portions of other tension springs to be unseparable therefrom; or, when mounting the tension springs S to their associated mount places, since it is difficult to correspond the hook portions Sa thereof to the associated through-bores (6) in the seat frame (1) correctly, the tension springs may be misplaced or misaligned.

SUMMARY OF THE INVENTION

The present invention is devised out in view of the above-mentioned circumstances in the prior art and aims at eliminating the above drawbacks found in the conventional tension spring mounting apparatus.

Accordingly, it is a main object of the invention to provide an improved apparatus which is capable of mounting tension springs in a seat frame of a vehicle seat or the like quickly and positively to be able to enhance the efficiency of the tension spring mounting operation.

In accomplishing this object, the apparatus of the invention comprises: a supply hopper including therein a rotary/vibratory dish formed with undulations on the surface thereof and adapted to separate and discharge tension springs by means of the vibratory rotation of the rotary/vibratory dish; a transfer mechanism adapted to deliver the tension springs discharged from the supply hopper to the predetermined positions thereof via a lining shute; a guide member disposed outside of the predetermined position of the transfer mechanism to rectify the right and left deviations of the tension springs when the one-end hook portions of the tension springs are slidingly contacted therewith during their movements; a setting device comprising an industrial robot adapted to pick up the tension springs delivered by the transfer mechanism and carry them up to their associated mount portions in the seat frame, and then to bring the one-end hook portions of the tension springs into engagement with associated through-bores formed in the side portions of the seat frame as engagement means and the other-end hook portions thereof into engagement with the side members of a pad receiving means in a sequential manner; and, a direction restricting member including forward and rearward guiding walls disposed above the tension spring catch portions of the setting device and having a substantially upwardly-converging configuration so as to be able to correspond to the one-end hook portions of the tension springs.

In operation, when a great number of tension springs are loaded into the supply hopper and the rotary/vibratory dish is then actuated, then the tension springs are disentangled and separated from one another due to the vibratory rotation of the rotary/vibratory dish with undulations to be discharged sequentially out of the discharge portion of the supply hopper. The discharged tension springs are then moved by the transfer mechanism and, during such movement, the one-end hook portions thereof are brought into sliding contact with the guide member so that the tension springs can be rectified in the right and left deviations thereof, before they are positioned in the catch portion of the setting device. When the tension springs are located in their predetermined positions in this manner, then the setting device is operated to catch and lift the tension springs. During this lifting operation, the one-end hook portions of the tension springs are respectively passed between the forward and rearward guide walls of the direction restricting member so that the tension springs are corrected in the inclination of the both-end hook portions thereof. Thus, while maintained in their corrected conditions, the tension springs are transferred to their mounting positions, such as positions above the seat frame which suspends the pad receiving means, where the one-end hook portions of the tension springs are brought into engagement with the associated through-bores in the seat frame, with the other-end hook portions thereof being brought into engagement with the side members of the pad receiving means. Thus, the tension springs can be automatically installed to the seat frame and the pad receiving means.

The above and other related objects and features of the invention will be apparent from a reading of the following description of the disclosure found in the accompanying drawings and novelty thereof pointed out in the appended claims.

DETAILED DESCRIPTION OF A PREFERRED EMBODIMENT OF THE INVENTION

Figure 1:
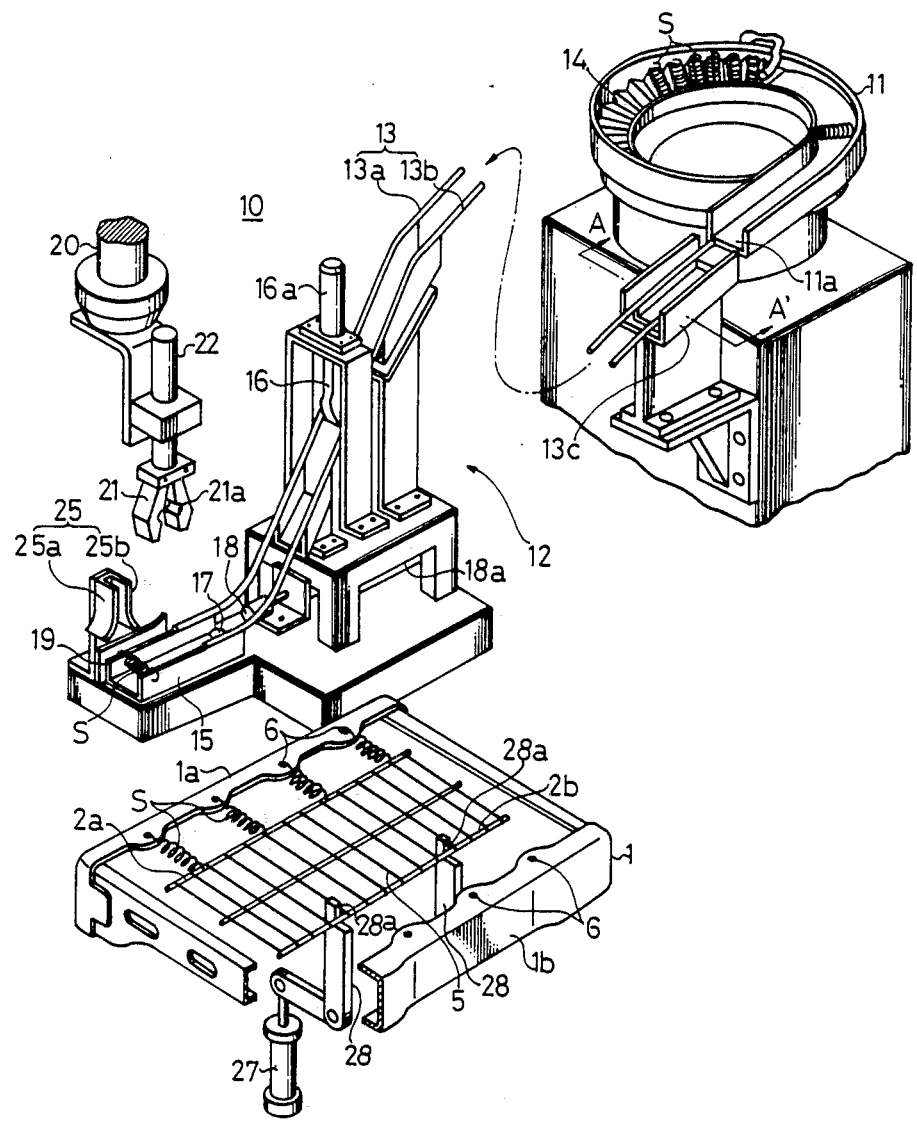
FIG. 1 is a perspective view, broken away in part, of the invention.
Figure 2:
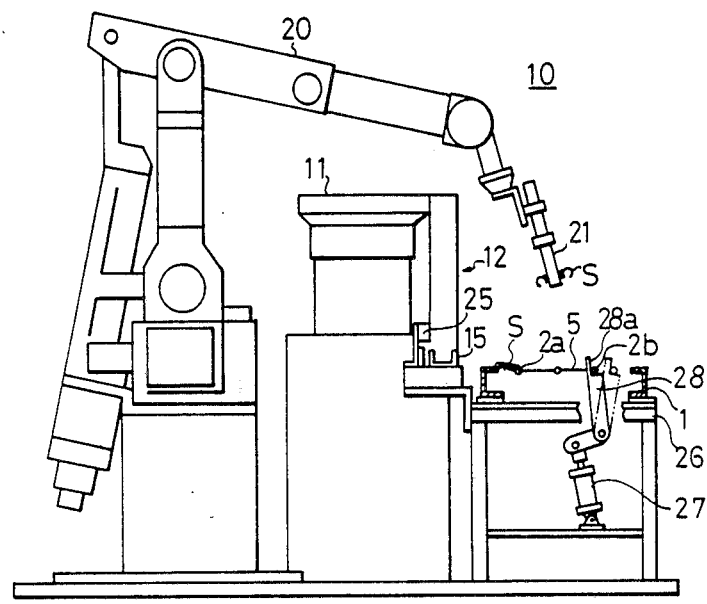
FIG. 2 is a front view of the same.
Figure 3:
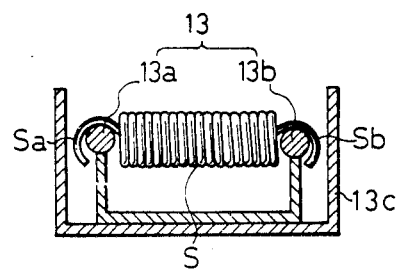
FIG. 3 is a section view taken along line A—A' of FIG. 1.

Now, a preferred embodiment of the invention will be described in connection with the accompanying drawings in mounting a pad receiving means to a seat frame of a vehicle seat by means of tension springs.

In the drawings, numeral (10) designates an entire apparatus according to the invention and (11) represents a supply hopper which is provided with a rotary separation mechanism. Thus, when loaded into the supply hopper, a plurality of tension springs S can be separated from one another and discharged one by one from the discharge portions (11a) of the supply hopper (11) into a lining shute (13) in a transfer mechanism (12). Specifically, in the interior of the supply hopper (11), there is provided a rotary/vibratory dish (14) having continuous undulations on the surface thereof and, as will be discussed later, the vibratory rotation of the rotary/vibratory dish (14) disentangles and separates the entangled tension springs placed thereon from one another.

The transfer mechanism (12) comprises the lining shute (13) and a rail member (15). The lining shute (13) comprises a pair of rails (13a) and (13b) having a distance therebetween corresponding to the distance between two hook portions Sa and Sb which are symmetrically formed in the two ends of each of the tension springs S, respectively. The paired rails (13a) and (13b) are inclined downwardly from the discharge portion (11a) of the supply hopper (11). The lower end portions of the paired rails are bent and connected to the two edges of the rail member (15) disposed horizontally and having a U-shaped section, respectively, while the upper portions thereof, that is, their connecting portions with the discharge portion (11a) of the supply hopper (11) are provided in the lower portions thereof with a cover member (13c) for preventing the tension springs S from falling off.

Also, substantially centrally of the inclined portion of the lining shute (13), there is provided a send-out device (16) which can be operated by the intermittent movements of an escape cylinder (16a) to send out one by one the tension springs S delivered from the supply hopper (11). Further, adjacently to the bent portion of the lining shute (13), there are arranged an adjacent switch (17) interposed between the two rails (13a) and (13b), and a push-out body (18) which can be slided back and forth by means of operation of a cylinder (18a) due to the sensing of the adjacent switch (17) to push out the tension springs S up to the tip end portion of the rail member (15), that is, up to a catch portion provided in a setting device to be described afterwards.

In addition, the transfer mechansim (12) is provided in the tip end portion thereof with a guide member composed of a guide plate (19) which is vertically located in parallel to and outside of one-side vertical surface portion of the rail member (15) at required intervals therefrom. The rear end portion of the guide plate is so formed to be widened outwardly, so that, during the movements of the tension springs S to be discussed later, the one-end hook portions Sa of the tension springs S can be brought into sliding contact with this guide plate (19).

A setting device (20) is provided so as to correspond to the tip end portion of the rail member (15). For this setting device (20), an industrial robot such as a multiarticulation robot, a rectangular coordinate type robot and the like can be employed. The setting device (20) is provided in the tip end portion thereof with a manipulator (21) for catching the tension springs S.

Figure 4:
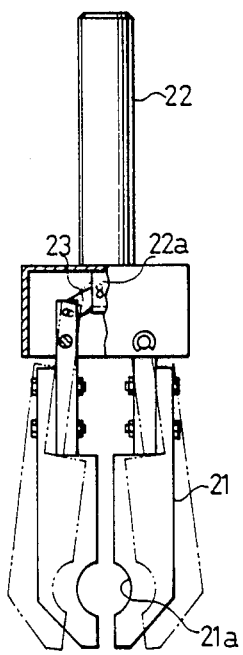
FIG. 4 is a front view, cut away in part, of a manipulator of a setting device employed in the invention.
Figure 5:
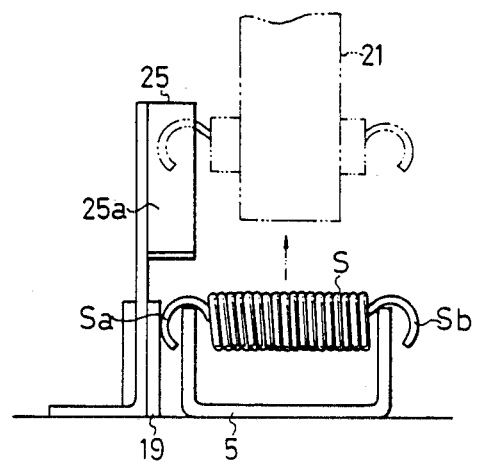
FIG. 5 is a front view of a portion of the setting device for catching tension springs.

The manipulator (21), as shown in FIG. 4, can be opened and closed through a link member (23) by means of the sliding motion of a cylinder rod (22a) caused by the operation of a cylinder (22), and is capable of gripping and holding the tension spring S is between and in two recessed portions (21a) respectively formed in the interiors of the tip end portion thereof. The gripping power of the manipulator (21) is set to such a degree that the tension spring S can be rotated with a predetermined friction in its circumferential direction.

The setting device (20) is set such that it can be operated after the push-out body (18) is actuated by the sensing of the above-mentioned adjacent switch (17) and the tension springs S are then set in the catch portion in the setting device (20), to grip the tension spring S by means of the manipulator (21) in the tip end thereof and lift it upwardly, then to transfer it up to its mounting portion, and finally to mount it in place.

Above the catch portion of the setting device (20) where the tension springs S are gripped by the manipulator (21), that is, above the tip end portion of the rail member (15), there is provided a direction restricting member (25) which is oriented vertically so as to correspond to the one-end hook portion Sa formed in the one end of the tension spring S. The direction restricting member (25) composed of two guide walls (25a) and (25b) which are spaced in a logitudinal direction of the setting device (20) and opposed to each other. The two guide walls (25a) and (25b) are so formed as to converge or narrow toward each other from the lower ends thereof to the upper ends thereof, with the distance between the upper ends thereof being slightly greater than the diameter of the tension springs S. In other words, the direction restricting member (25) is constructed such that, when the tension springs S are caught and lifted up by the setting device (20), as will be described later, due to the passage of the one-end hook portions Sa thereof, the inclined tension springs S can be rectified to the vertical direction.

Adjacently to the above-mentioned automatic tension spring mounting apparatus (10), namely, the transfer mechanism (12) thereof, there is arranged a working platform (26) which is used to provide the pad receiving means (5) in the seat frame (1). The working platform (26) is provided with a drawing device (28) which can be rotated transversely by means of operation of a cylinder (27) to draw the pad receiving means (5), and the drawing device (28) is formed at the tip end thereof with a cutaway engagement portion (28a) which is projected out into the upper surface of the working platform (26). As will be discussed later, when the otherside member (2b) of the pad receiving means (5) is brought into engagement with the engagement portion (28a), if the cylinder (27) is actuated, then the other-side member (2b) of the pad receiving means (5) is drawn toward the otherside portion (1b) of the seat frame (1) while the tension springs S are being mounted between the one-side member of the pad receiving means (5) and the one-side portion (1a) of the seat frame (1).

Next, we will describe the operation of the present apparatus constructed in the above-mentioned manner.

At first, the seat frame (1) is set at its given position in a support bench (24) and the pad receiving means (5) is interposed between the two side portions (1a)(1b) of the seat frame (1). During this operation, the pad receiving means (5) is supported using a jig, for example: the distance between the one-side member (2a) thereof and throughbores (6) formed in the one-side portion (1a) of the seat frame (1) is set so as to correspond to the distance between the hook portions Sa and Sb formed in the two ends of the respective tension springs S, that is, the former distance is set such that the tension springs S can be mounted between the one-side member (2a) and the through-bores (6), while the other-side member (2b) of the pad receiving means (5) is hitched in the tip-end engagement portion (28a) of the drawing device (28) to be engaged therewith.

After the seat frame (1) and pad receiving means (5) are thus set, when a large number of tension springs S are loaded into the supply hopper (11) and the rotary/-vibratory dish (14 is operated, then, due to the vibratory rotation of the rotary/vibratory dish (14), the tension springs S are respectively disentangled in the two end hook portions Sa and Sb thereof to be separated from one another in such a manner that each tension spring is stored in each recessed portion of the undulations on the surface of the dish (14); and thus the tension springs S are then discharged one by one through the discharge portion (11a) from the supply hopper in a sequential manner.

The tension springs S that are discharged from the supply hopper (11) in this way, with the two-end hook portions thereof Sa and Sb being respectively engaged with the two rails (13a) and (13b) of the lining shute (13), are then moved along the inclined surface of the shute (13) and are lined and collected in front of the send-out device (16), where they are caused to drop one by one by means of operation of the send-out device (16) which is actuated by the intermittent motion of the escape cylinder (16a). When the dropped tension springs S pass over the adjacent switch (17) and are sensed by this switch (17), then the cylinder (18a) is operated to allow the push-out body (18) to press against the tension springs S forwardly, so that since the one-end hook portions Sa thereof are brought into sliding contact with the guide plate (19) the tension springs S are forced to rectify their right and left deviations before they are positioned in the tip end portion of the rail member (15), or in the catch portion of the setting device (20) to catch them by means of the manipulator (21).

When the tension springs S are transferred in this way to the catch portion of the setting device (20), then the setting device (20) is operated so that the tension springs S are gripped or caught by the manipulator (21) to be lifted just above the gripped positions thereof.

During this, the one-end hook portions Sa of the tension springs S are passed between the two guide walls (25a) and (25b) of the direction restricting member (25) and thus the inclination of the two-end hook portions Sa and Sb thereof are forcedly corrected to the vertical direction.

Figure 6:
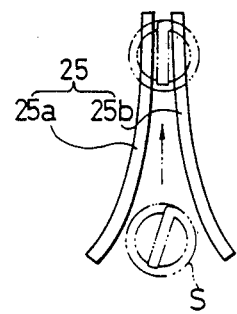
FIG. 6 is an explanatory view of a direction restricting member employed in the invention, illustrating how to rectify the inclination of the hook portions of the tension springs.

In other words, if the tension spring S is lifted up with the hook portions Sa and Sb thereof being inclined, then the tension spring S is moved upwardly while the one-end hook portion Sa thereof is in sliding contact with the inner surfaces of the guide walls (25a) and (25b) which are formed in an upwardly-converging manner. Thus, the tension spring S is rotated in its circumferential direction against the gripping force of the manipulator (21) so that the inclination of the one-end hook portion Sa thereof is rectified to the vertical direction, that is, the tip end thereof is faced downwardly, while the inclination of the other-end hook portion Sb thereof which is formed in inclination symmetrically with respect to the one-end hook portion Sa is also corrected to the vertical direction (see FIG. 6).

The tension springs S, caught and lifted up by the manipulator (21) of the setting device (20) in the above-mentioned manner, are then transferred to the mounting portion in the seat frame (1), where the one-end hook portions Sa of the tension springs S are brought into engagement with the associated through-bores (6) formed in the seat frame (1) and the other-end hook portions Sb thereof are engaged with the one-side member (2a) of the pad receiving means (5).

Figure 7:
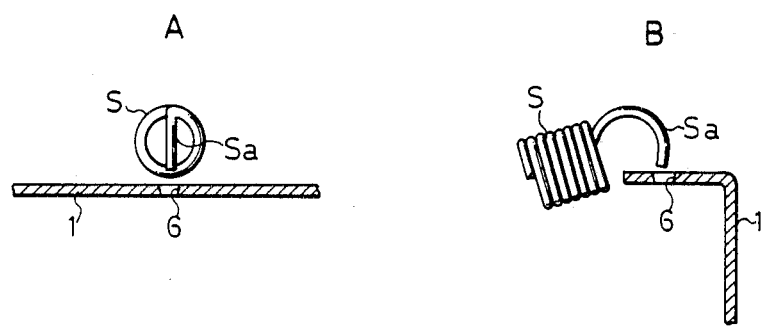
FIG. 7 is an explanatory view to illustrate how to bring the hook portion of the tension spring into engagement with its associated through-bore in a seat frame, in which A is a longitudinally sectional side view of the hook portion and the through-bore and B is a longitudinally sectional front view thereof.

In this mounting operation, since the one-end hook portions Sa of the tension springs S have been previously rectified in the direction of their tip ends by the direction restricting member (25), their engagement with the through-bores (6) of the seat frame (1) can be performed quite smoothly (see FIG. 7).

Also, in the above-mentioned tension spring S mounting operation, when there occurs a slight error which causes the one-end hook portions Sa of the tension springs S to correspond to the through-bores (6) of the seat frame (1) with a slight deviation, since the gripping force of the manipulator (21) is set weak, the manipulator (21) may be loosened so that the tension springs S may be forcedly inserted into the through-bores (6).

By means of repetition of the above-mentioned operations, at first, a required number of tension springs are sequentially mounted between the seat frame one side portion, that is, the one side surface portion (1a) of the seat frame (1) and the one-side member (2a) of the pad receiving means (5). When the mounting of the tension springs S in the one side portion of the seat frame (1) is completed, an operation completion instruction actuates the cylinder (27) to rotate the drawing device (28). The rotational motion of the draw device (28) draws the other-side member (2b) of the pad receiving means (5) engaged with the tip end portion (28a) thereof toward the other side surface portion (1b) of the seat frame (1), so that the distance between the throughbores (6) and the other-side member (2b) of the pad receiving means (5) is set so as to correspond to the distance between the two end hook portions Sa and Sb of the tension springs S, namely, the former distance is set in such a condition that the tension springs S can be duly mounted.

Figure 8:
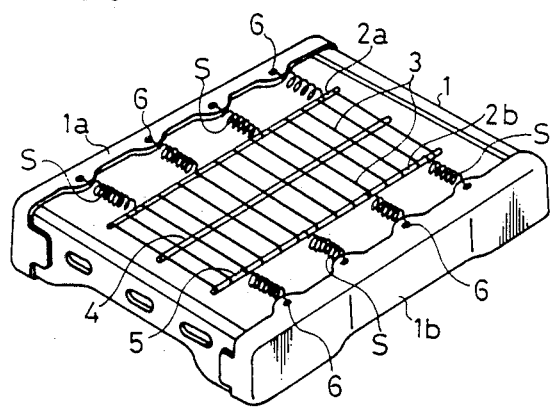
FIG. 8 is a perspective of the seat frame which has been provided with a pad receiving means extended therein by means of the tension springs.

Then, the setting device (20) is operated again and, similarly to the above-mentioned manner, a required number of tension springs S are mounted between the seat frame other side portion, that is, the other side surface portion (1b) of the seat frame (1) and the other-side member (2b) of the pad receiving means (5). When these operations are all completed, then the cylinder (27) is caused to stop its operation to remove the traction of the other-side member (2b) of the pad receiving means (5) by the drawing member (28), so that the pad receiving means (5), as shown in FIG. 8, can be resiliently extended within the seat frame (1) by means of the two side tension springs S.

Thus, according to the present apparatus, it is possible to mount the tension springs S for the pad receiving means (5) in the seat frame (1) automatically by means of combination with the existing facilities such as an industrial robot, manipulator and the like. Also, the automatic setting of the seat frame (1) and pad receiving means (5) can realize an unmanned line throughout the whole process.

As discussed hereinbefore, according to the invention, the tension springs, when loaded into the supply hopper, are separated from one another by the separation mechanism of the supply hopper and then discharged from the supply hopper one by one; the discharged tension springs are transferred by the transfer mechanism; the tension springs are rectified in the right and left deviations thereof by the guide member and then located in the portion where they are to be caught by the setting device; the thus-located tension springs are caught and lifted up by means of operation of the setting device; during the lifting operation, the inclination of the hook portions of the tension springs is rectified by the direction restricting member; and, the tension springs are then mounted in their respective mount positions. Accordingly, the mounting operations of the tension springs can be performed automatically, speedily and accurately, which provides a far improved working efficiency over the prior art.

What is claimed is:

1. Apparatus for mounting tension springs automatically, the apparatus comprising:
   a supply hopper provided with a separation mechanism for separating from one another tension springs formed with hook portions in the two ends thereof;
   a transfer mechanism for transferring said tension springs discharged from said supply hopper to a predetermined position;
   a guide member disposed outside said predetermined position for rectifying the right and left deviations of said tension springs while said tension springs are being transferred by said transfer mechanism;
   a setting device located correspondingly to said predetermined position for catching and moving said tension springs to the mounting portion thereof as well as mounting said tension springs in position; and,
   a direction restricting member disposed above said predetermined position for rectifying the inclination of said hook portions of said tension springs caught and lifted up by said setting device.

2. The apparatus as claimed in claim 1, wherein said tension spring separation mechanism of said supply hopper comprises a rotary/vibratory dish having continuous undulations on the surface thereof.

3. The apparatus as claimed in claim 1, wherein said transfer mechanism comprises a lining shute and a rail member successively connected with said lining shute, wherein said lining shute comprises a pair of rails spaced from each other such a distance as corresponds to the distance between said hook portions symmetrically formed in the two ends of each of said tension springs, is inclined downwardly from the discharge portion of said supply hopper, and is bent formed in the lower end portion thereof, and wherein said rail member successively connected with said lower end portion of said lining shute is formed in a configuration of a U-shaped cross section.

4. The apparatus as claimed in claim 1, wherein substantially centrally of said inclined portion of said lining shute in claim 3, there is provided a send-out device operable by the intermitten motion of an escape cylinder to send out one by one said tension springs delivered thereto from said supply hopper.

5. The apparatus as claimed in claim 1, wherein adjacently to said bent portion of said lining shute in claim 3, there is provided a push-out body for pushing out said tension springs to said setting device, and wherein said push-out body comprises an adjacent switch interposed between said two rails forming said lining shute and a cylinder slidable back and forth by said adjacent switch sensing the passage of said tension springs to push out said tension springs to the tip end portion of said rail member.

6. The apparatus as claimed in claim 1, wherein said guide member comprises a guide plate vertically provided outside the one-side vertical surface portion of said rail member of said transfer mechanism and located in parallel to and at a required interval from said said rail member one-side vertical surface portion so as to correspond thereto.

7. The apparatus as claimed in claim 1, wherein said setting device comprises an industrial robot located so as to correspond to said rail member tip end portion and is provided in the tip end portion thereof with a manipulator for catching said tension springs.

8. The apparatus as claimed in claim 1, wherein said direction restricting member comprises two guide walls located above said rail member tip end portion and opposed to each other longitudinally of said apparatus, and wherein said guide walls are formed so as to become narrower upwardly from the lower end portions thereof to the upper end portions thereof, and the distance between said upper end portions thereof is so set as to be slightly greater than the coil diameter of said tension springs.

9. The apparatus as claimed in claim 1, wherein adjacently to said transfer mechanism, there is provided a work bench for mounting a pad receiving member to a seat frame of an automotive seat, there is located in said work bench a draw device rotatable transversely by operation of a cylinder to pull said pad receiving member, said draw device is formed in the tip end thereof with a cut-formed engagement portion being projected from the upper surface of said work bench and engageable with said pad receiving member, and, when said pad receiving member is engaged with said engagement portion of said draw device, said pad receiving member can be pulled toward said seat frame by means of operation of said cylinder.

* * * * *